United States Patent
Abdul-Kader

(10) Patent No.: US 11,293,508 B2
(45) Date of Patent: Apr. 5, 2022

(54) CALCIUM SILICATE POWDERS

(71) Applicant: PRTC NV, Tisselt (BE)

(72) Inventor: Oras Abdul-Kader, Sint Niklaas (BE)

(73) Assignee: PRTC NV, Tisselt (BE)

( * ) Notice: Subject to any disclaimer, the term of this patent is extended or adjusted under 35 U.S.C. 154(b) by 54 days.

(21) Appl. No.: 16/348,575

(22) PCT Filed: Nov. 10, 2017

(86) PCT No.: PCT/EP2017/078939
§ 371 (c)(1),
(2) Date: May 9, 2019

(87) PCT Pub. No.: WO2018/087318
PCT Pub. Date: May 17, 2018

(65) Prior Publication Data
US 2019/0277360 A1    Sep. 12, 2019

(30) Foreign Application Priority Data

Nov. 11, 2016 (EP) .................................... 16198529

(51) Int. Cl.
| | | |
|---|---|---|
| *C04B 14/04* | (2006.01) | |
| *F16D 69/02* | (2006.01) | |
| *C09C 1/30* | (2006.01) | |
| *C04B 14/00* | (2006.01) | |

(52) U.S. Cl.
CPC .......... *F16D 69/027* (2013.01); *C09C 1/3054* (2013.01); *C09C 1/3081* (2013.01); *C01P 2004/61* (2013.01); *C01P 2004/80* (2013.01); *C01P 2006/12* (2013.01); *F16D 2200/0065* (2013.01); *F16D 2200/0069* (2013.01)

(58) Field of Classification Search
USPC .......................... 106/400, 401, 481, 482, 490
See application file for complete search history.

(56) References Cited

U.S. PATENT DOCUMENTS

| | | | | |
|---|---|---|---|---|
| 4,060,508 A | * | 11/1977 | Sugahara | C08K 3/34 523/440 |
| 4,447,380 A | * | 5/1984 | Shannon | C04B 28/18 264/333 |
| 2006/0171972 A1 | * | 8/2006 | Witham | A61K 8/25 424/401 |
| 2017/0112735 A1 | | 4/2017 | Okada et al. | |

FOREIGN PATENT DOCUMENTS

| | | | |
|---|---|---|---|
| JP | 2014-080305 A | | 5/2014 |
| JP | 2014080305 A | * | 5/2014 |
| WO | 2015/151997 A1 | | 10/2015 |

* cited by examiner

*Primary Examiner* — James E Mcdonough
(74) *Attorney, Agent, or Firm* — Dilworth & Barrese, LLP

(57) ABSTRACT

Calcium silicate powders are provided. The calcium silicate powders comprise porous calcium silicate particles and an additive, the additive being at least partially penetrated into the pores of the particles. The additive is present in an amount of between 1.5 and 50%w, wherein %w is the weight ratio, expressed as percentage, of the dry weight of the additive over the dry weight of the combination of the calcium silicate particles and additive.

25 Claims, No Drawings

CALCIUM SILICATE POWDERS

FIELD OF THE INVENTION

The present invention relates to a calcium silicate powders, in particularly calcium silicate hydrate powders, as well as methods to provide such powders.

BACKGROUND OF THE INVENTION

Calcium silicate powders are known in the art. In general they are used because of their light weight since these powders in general are porous or needle shaped. They are known for their particular thermal insulation. These powders are also used as compound in e.g. friction brakes.

SUMMARY OF THE INVENTION

The porous calcium silicate particles present in such powders can be used as carriers for chemical compounds, which are added to these particles as additives. The additives can also cause the mechanical and chemical properties of the powder to be tuned to their final use.

When applied in proper amounts and by proper means, the additive impregnates at least partially in to the pores instead of being present at the outer surface of the particles only.

The porous calcium silicate particles present in such powders are found to be very suitable as carries for additives to be integrated in mixtures such as dry mixtures.

The incorporation of additives, in particular anticorrosive agents such as alkali silicates, in the porous calcium silicate particles of calcium silicate powder, which on its turn is used as a component in friction material of friction brakes, may lead to friction material of friction brakes, the additives leading to reduced or even avoiding corrosion, reducing the wear rate and/or reducing noise generation, reducing or avoiding stiction of the friction brake material on brake disc or pad, etc.

According to a first aspect of the invention, calcium silicate powders are provided. the calcium silicate powders comprise porous calcium silicate particles and an additive, the additive being at least partially penetrated into the pores of the particles, the additive being present in an amount of between 1.5 and 50%w, wherein %w is the weight ratio, expressed as percentage, of the dry weight of the additive over the dry weight of the combination of the calcium silicate particles and additive.

Dry weight means the weight of the substance, excluding physically or chemically bound water.

The additive may be present in an amount of between 3 and 45%w of said calcium silicate particles. More preferred, said additive may be present in an amount of between 13 and 45%w of said calcium silicate particles, such as between 13 and 35%w of said calcium silicate particles, e.g. between 14 and 28%w, e.g. 15%w, 21.5%w or 26.5%w.

According to some embodiments, the calcium silicate powder may comprise synthetic porous calcium silicate particles.

Synthetic porous calcium silicate particles are produced by reacting a calcareous material and a siliceous material in an aqueous slurry under increased temperature and pressure. Depending on the pressure, temperature and time of reaction, such synthetic porous calcium silicate particles comprise higher or lower quantities of Xonotlite and/or Tobermorite, next to unreacted calcareous material and a siliceous material.

According to some embodiments, the porous calcium silicate particles may be porous calcium silicate hydrate particles.

According to some embodiments, the porous calcium silicate particles may comprise xonotlite and/or tobermorite crystal.

Xonotlite crystals, also referred to as Xonotlite, refers to crystals which have—on average—a chemical formula of $Ca_6Si_6O_{17}(OH)_2$. Tobermorite crystals, also referred to as Tobermorite, refers to crystals which have—on average—a chemical formula of $Ca_5Si_6O_{16}(OH)_2$.

According to some embodiments, the porous calcium silicate particles may comprise crystalline material in an amount in the range of 60 to 95%w, this %w being based upon the total weight of the particles.

Porous calcium silicate particles may be composed of a combination of xonotlite and tobermorite crystals, which together preferably provide 50%w or more of the particles, such as an amount in the range of 60 to 95%w of crystal material being present in the particles. Preferably the porous calcium silicate particles comprise more than 50%w, preferably more than 70%w, such as in the range of 75%w to 90%w, of xonotlite crystals, this %w being based upon the total weight of the particles.

The weight ratio xonotlite/tobermorite may vary from 100/0 to 0/100.

According to some embodiments, the weight ratio xonotlite/tobermorite maybe in the range of 95/5 to 5/95, inclusive. The weight ratio xonotlite/tobermorite may vary from 90/10 to 10/90, inclusive.

Porous calcium silicate particles with a high xonotlite content are preferred as the more xonotlite present, the higher the absorption of the particle will be.

According to some embodiments, the porous calcium silicate particles may have pores providing at least 75% of the particle volume, more preferred more than or equal to 90%.

The porous calcium silicate particles may have an oil absorption capacity of 100 to 400%, such as an oil absorption capacity of 100 to 300%. This oil absorption capacity is measured using ASTM D281-31.

The porous calcium silicate particles may have a pH between 9-11.

The calcium silicate powders according to the present invention may also be suitable due to their high specific surface area. The porous calcium silicate particles may have typically a BET value of 30 to 60 m$^2$/g, such as a BET value of 30 to 50 m$^2$/g. The specific surface area is measured in m$^2$/g as the BET (Brunauer-Emmett-Teller) surface area, for instance determined according to the test method ISO9277: 2010.

The calcium silicate particles preferably have a number average particle size between 5 and 300 μm.

The pore size of these materials should be large enough to infiltrate a liquid solution of the additive under mixing at room temperature and at least slightly elevated pressure. The minimum pore size may be at least 0.01 μm. For example the maximum pore size may be no greater than 5 microns. The pore sizes are measured using ISO 16901-2:2006.

Preferably, the particulate calcium silicate particles may have a substantially spherical particle morphology.

Preferably, the calcium silicate particles may have an average particle size in the range of 35 to 85 μm.

Preferably, the calcium silicate particles comprises micro-pores externally and macro-pores internally. Products sold under the trade name Promaxon, for instance Promaxon D or Promaxon T, and available for Promat International (Belgium) are suitable particulates.

According to some embodiments, at least 25%w of the additive is penetrated into the pores of the particles. More preferred, more than or equal to 50%w of the additive is penetrated into the pores of the particles, even more than or equal to 75%w or even 90%w or more may be penetrated into the pores of the particles.

According to some embodiments, the additive may be an inorganic additive. According to some embodiments, the additive may be chosen from the group consisting of alkali silicates, components with siloxane functional groups and silicones, or any combination thereof.

According to some embodiments, the additive may be an alkali silicate or a combination of alkali silicates.

Alkali silicates typically have the general formula $SiO_2/M_2O$, where M is an alkali metal. Alkali silicates suitable for use in the method of the invention may be in the form known as "waterglass", which is an aqueous solution of the alkali silicate. The ratio of $SiO_2:M_2O$ determines the alkalinity. It is preferred that rather alkaline forms are utilized in the invention.

Alkali silicates may be sodium silicate, potassium silicate, lithium silicate, or combinations of two or all three. Sodium silicate and potassium silicate, or combinations of both, are preferred.

Sodium silicate is particularly preferred. Sodium silicate of the formula $SiO_2/Na_2O$ is suitable for use in the invention due to its low cost, ready availability and high dissolution rates.

According to some embodiments, the additive may be sodium silicate.

According to some embodiments the additive may be sodium silicate with a $SiO_2:Na_2O$ ratio of no more than 3.5, preferably no more than 3.25.

According to some embodiments, the additive may be sodium silicate with a $SiO_2:Na_2O$ ratio of at least 1.60, more preferably at least 3.00.

This amount of alkali silicate as set out above may offer optimum controlled delivery of alkali silicate when used as an anticorrosive agent to friction material used in friction brakes. Whilst anticorrosive agent is provided to the brake surface, the ease of processing and toughness and strength of the friction material is maintained.

According to some embodiments, the additive may comprise one or more components with siloxane functional groups. According to some embodiments, the additive may be one or more silicones.

Such additive may render the calcium silicate powder a more hydrophobic property.

The calcium silicate powder according to the invention, also referred to as infiltrated calcium silicate powder, has several advantages. The additive changes the general behavior of the calcium silicate powder. It may also change the general acidity of the powder.

The calcium silicate powders according to the present invention are thermally resistant up to 800° C. or even above, which, when used as component in a matrix, such as a friction material, may cause the matrix to endure large and rapid temperature changes, for example during braking with friction brakes comprising friction material including said powder.

The surface polarity of the calcium silicate powders according to the present invention may also be an advantage where it is compatible with the polarity of the additives that it is carrying, especially when the additive is alkali silicate, and is provided as a liquid or solution.

Alkali silicates are especially advantageous due to the chemical compatibility with the calcium silicate, facilitating easy processing to infiltrate the alkali silicate into the pores. Calcium silicate porous particles may have a melting temperature as high as 1540° C., making them eminently suitable for inclusion in e.g. a friction material that is subject to high temperatures, for example a brake pad. Alkali silicates are preferred as the anticorrosive agent because they are sufficiently inert for use in a friction material without requiring further processing steps. Alkali silicates also may increase the pH of the friction surface, making kinetic and thermodynamic conditions less favorable for corrosion.

The inclusion of an additive, e.g. an anticorrosive agent, within the pores of calcium silicate particles of calcium silicate powder, facilitates good dispersion of the additive throughout the matrix in which the calcium silicate powder is used as component. In addition, including an additive in this manner in a matrix facilitates controlled release of the additive over time. When alkali silicate—being the additive—is used in combination with calcium silicate particles according to the invention, which powder is used as a component in the matrix of friction material of a brake pad, said friction material may experience less or entirely avoid damaging corrosion during use of the brake.

Furthermore, the present invention allows alkali silicate as an anticorrosive agent in friction brake material. The ability to create high pH conditions, in particular for calcium silicate, when used as component in friction material, at the friction surface, thus making the chemical reactions for corrosion, particularly for metals and alloys such as steel, unfavorable.

According to a further aspect of the invention, methods for producing calcium silicate powder is provided, which methods comprises the steps of
Providing porous calcium silicate particles in a mixing device;
Agitating said porous calcium silicate particles in said mixing device;
providing an additive as a component of a solution further comprising a solvent into the mixing device while agitating said porous calcium silicate particles;
mixing at high shear said porous calcium silicate particles with said additive.

Agitating is to be understood as moving or stirring up. The porous calcium silicate particles are brought and kept into motion while adding the solution. This to avoid creation of conglomerates, as these will be difficult to break during mixing, if possible at all. Combining the particles with this solution in this way, combined with high shear mixing cause the solution, including the additive, to be able to penetrate into the pores of the particles, while keeping the mixture behave as a free flowing powder.

The agitation and the mixing at high shear can be done using the same high shear mixer.

Optionally the solvent used to provide the solution, may be removed by e.g. drying. This drying may be done by using a fluidized bed, in which heated gas, such as heated air, is used to fluidize a bed of parties to be dried. The humidity in the particles is transferred to the heated gas.

Most preferably the weight ratio of the solution and the porous calcium silicate particles is not more than 2.5, preferably even less than 2, more preferred less than 1.3.

The solution may comprise water as solvent.

According to some embodiments of the invention, the additive may be provided as an aqueous solution.

The aqueous solution may comprise the additive being an inorganic additive. The aqueous solution may comprise the additive being an alkali silicate, components with siloxane functional groups and/or a silicone.

According to some embodiments of the invention, the additive may be present in an amount of between 1.5 and 50%w, wherein %w is the weight ratio, expressed as percentage, of the dry weight of the additive over the dry weight of the combination of the calcium silicate particles and additive.

The amount of additive provided is in general equal to the amount of the additive to be present in the calcium silicate powder to be provided.

Though it is not completely understood why, the use of adding the solution while agitating the powder, followed by high shear mixing reduces to a large extent the tendency of the powder particles and additive to clog an form larger conglomerates during mixing, this while the additive is forced to infiltrate or penetrate into the pores of the powder particles.

The mixing may cause the temperature to raise. This may improve the infiltration to a further extent. The increase in temperature may also be induced by heating the mixing device. Temperatures to 80 or 100° C. may be useful, but temperatures up to 60° C. or 65° C. are more preferred.

According to some embodiments of the invention, the mixture of porous calcium silicate particles and additive may be sieved using a sieve retaining particles of more than 500 μm. More preferred a sieve retaining particles of 400 μm or more is used. As such, conglomerates which occasionally have occurred, can be removed.

According to some embodiments of the invention, at least part of the solvent may be removed.

Depending on the solvent used and the amount of solvent, the solvent, e.g. water, may infiltrate into the pores of the calcium silicate particles as well, or is removed, e.g. by applying a drying step.

In case of water being the solvent, either with or without applying such drying step, part of the water may remain present in the calcium silicate powder as chemically bond water, to e.g. the alkali silicate molecules.

The method according to the invention may provide calcium silicate powder according to the invention. This method ensures the particles to remain substantially undamaged and uncrushed, while the additive may penetrate or infiltrate at least partially, but usually to a large extent, in the porous structure, i.e. the pores of the particles.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description which illustrate, by way of example, the principles of the invention. This description is given for the sake of example only, without limiting the scope of the invention.

DESCRIPTION OF ILLUSTRATIVE EMBODIMENTS

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

According to an embodiment of the invention, Promaxon D of Promat International (BE) is provided and added in a cyclomixer of Hosokawa.

Promaxon D is a crystalline calcium silicate powder, in particular are synthetic porous calcium silicate hydrate particles, comprising 95%w of crystalline calcium silicate hydrate, in particular 80%w of xonotlite and 15%w of tobermorite. These %w are based upon the dry weight of the synthetic porous calcium silicate hydrate particles. The powder has an average particle size in the range of 35 to 85 μm, an oil absorption of about 300 g/100 g and a BET specific surface area of more than 40 m$^2$/g.

To this powder, while gently agitating the powder, an amount waterglass type sodium silicate waterglass with solid content of about 36%w is provided. The waterglass solution used was Crystal 0075. This amount of waterglass, being the sodium silicate and the solvent being water, was absorbed into the particulates. The $SiO_2:Na_2O$ ratio in the waterglass was 3.22.

This mixture is mixed at high shear during about 5 minutes at 750 rpm using a closed mixing unit. The mixed slurry is sieved using a sieve retaining particles of 400 μm and more, and dried to the air. As an alternative, the mixed and sieved slurry is dried using a fluidized bed drying unit.

7 mixtures were prepared, wherein for each 100 gram of Promaxon D (dry weight), an amount of waterglass (about 36%w of sodium silicate (dry state) with $SiO_2:Na_2O$ ratio of 3.22) and 64%w of water) was added, the amounts being (in gram) 25, 50, 75, 100, 125, 150 and 200.

As such, calcium silicate powder comprising porous calcium silicate particles and sodium silicate present in an amount of 8.25%w, 15.25%w, 21.25%w, 26.47%w, 31.03%w, 35.06%w and 41.86%w are provided, wherein %w means the ratio, expressed as percentage, of the dry weight of the sodium silicate over the dry weight of the calcium silicate particles and the sodium silicate.

It was noticed that substantially all waterglass was penetrated or infiltrated in the pores of the calcium silicate powder partials. As such calcium silicate hydrate powders comprising porous calcium silicate particles, the sodium silicate and water, which water is either present as such in the calcium silicate powder, or chemically bound to the sodium silicate.

As an alternative, a Nauta mixer type Vrieco-Nauta® conical screw mixer can be used.

As an alternative, the used additive may be a silicone, provided as an aqueous slurry to the mixer. An example of a suitable silicone is Z6289 silicone emulsion of Dow Corning added in ratio between 0.1-10%w, preferably between 2.5 and 3.5%w, such as 3%w, %w being the weight over the dry weight of the Promaxon D.

As a further alternative, the used additive may be a siloxane comprising component, provided as an aqueous slurry to the mixer. An example of a such suitable component is organo modified siloxane Tegomer VSI 4042 of Evonik, added in ratio between 0.1-10%w, preferably between 2.5 and 3.5%w, such as 3%w, %w being the weight over the dry weight of the Promaxon D.

It is to be understood that although preferred embodiments and/or materials have been discussed for providing embodiments according to the present invention, various modifications or changes may be made without departing from the scope and spirit of this invention.

The invention claimed is:

1. A calcium silicate powder comprising
   discrete porous calcium silicate particles having a specific surface area with a BET value of 30 to 60 $m^2/g$ and a pore size of at least 0.01 microns and no greater than 5 microns, and
   separate particles of an additive,
   said additive being at least partially penetrating into the pores of said calcium silicate particles,
   the additive is present in an amount of between 1.5 and 50%w, wherein %w is the weight ratio, expressed as percentage, of the dry weight of the additive over the dry weight of the combination of said calcium silicate particles and additive, and
   the additive is an alkali silicate or a combination of alkali silicates.

2. A calcium silicate powder according to claim 1, wherein at least 25%w of the additive is penetrated into the pores of the particles.

3. A calcium silicate powder according to claim 2, wherein more than or equal to 50%w of the additive is penetrated into the pores of the particles.

4. A calcium silicate powder according to claim 2, wherein more than or equal to 75%w is penetrated into the pores of the particles.

5. A calcium silicate powder according to claim 1, said calcium silicate particles comprise synthetic porous calcium silicate particles.

6. A calcium silicate powder according to claim 1, said calcium silicate particles comprise synthetic porous calcium silicate, wherein said porous calcium silicate particles are porous calcium silicate hydrate particles.

7. A calcium silicate powder according to claim 6, wherein said porous calcium silicate particles comprise xonotlite and/or tobermorite crystals.

8. A calcium silicate powder according to claim 7, wherein the weight ratio xonotlite/tobermorite is in the range of 95/5 to 5/95, inclusive.

9. A calcium silicate powder according to claim 5, wherein the porous calcium silicate particles comprise crystalline material in an amount in the range of 60 to 95%w, this %w being based upon the total weight of the particles.

10. A calcium silicate powder according to claim 1, wherein the porous calcium silicate particles have pores providing at least 75% of the particle volume.

11. A calcium silicate powder according to claim 1, wherein said additive is sodium silicate.

12. A calcium silicate powder according to claim 11, wherein the additive is sodium silicate with a $SiO_2:Na_2O$ ratio of no more than 3.5.

13. A calcium silicate powder according to claim 11, wherein the additive is sodium silicate with a $SiO_2:Na_2O$ ratio of at least 1.60.

14. A calcium silicate powder according to claim 11, wherein the $SiO_2:Na_2O$ ratio is at least 3.00.

15. A friction brake comprising the calcium silicate powder according to claim 1.

16. A calcium silicate powder according to claim 1, consisting of said porous calcium silicate particles and said alkali silicate or combination of alkali silicates at least partially penetrating into the pores of the calcium silicate particles.

17. A calcium silicate powder according to claim 1, wherein the discrete porous calcium silicate particles have a specific surface area with a BET value of 30 to 50 $m^2/g$.

18. A calcium silicate powder according to claim 1, wherein the additive is present in an amount of between 13 and 45%w.

19. A calcium silicate powder according to claim 18, wherein the additive is present in an amount of between 20 and 40%w.

20. A calcium silicate powder according to claim 1, wherein the calcium silicate particles have a pore size of at least 0.1 microns and no greater than 5 microns.

21. A calcium silicate powder according to claim 12, wherein the $SiO_2:Na_2O$ ratio is no more than 3.25.

22. A calcium silicate powder according to claim 13, wherein the $SiO_2:Na_2O$ ratio is at least 3.00.

23. A calcium silicate powder according to claim 12, wherein the $SiO_2:Na_2O$ ratio is at least 1.60.

24. A calcium silicate powder according to claim 14, wherein the $SiO_2:Na_2O$ ratio is no more than 3.25.

25. A calcium silicate powder according to claim 1, wherein the additive is in the form of waterglass when combined with the discrete calcium silicate particles.

* * * * *